United States Patent
Meyer et al.

(10) Patent No.: US 8,850,213 B2
(45) Date of Patent: Sep. 30, 2014

(54) METHOD FOR VERIFYING AN ELECTRONIC SIGNATURE AND DATA PROCESSING DEVICE

(71) Applicant: Infineon Technologies AG, Neubiberg (DE)

(72) Inventors: Bernd Meyer, Munich (DE); Erwin Hess, Ottobrunn (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 13/752,456

(22) Filed: Jan. 29, 2013

(65) Prior Publication Data

US 2014/0215219 A1    Jul. 31, 2014

(51) Int. Cl.
- G06F 17/30 (2006.01)
- H04L 9/28 (2006.01)
- H04L 9/32 (2006.01)

(52) U.S. Cl.
CPC .................... *H04L 9/3247* (2013.01)
USPC ........................................ 713/176

(58) Field of Classification Search
USPC ........................................ 713/176
See application file for complete search history.

(56) References Cited

U.S. PATENT DOCUMENTS 6,910,058 B2 * 6/2005 Futa et al. ............ 708/491
7,137,007 B2 * 11/2006 Terao et al. ............ 713/180

FOREIGN PATENT DOCUMENTS

DE    10161137 A1    10/2003

OTHER PUBLICATIONS

English Abstract of DE 10161137 A1 dated Feb. 5, 2013.

* cited by examiner

*Primary Examiner* — Tu Nguyen

(57) ABSTRACT

A method for verifying an electronic signature is described including determining a residue class given by the signature; determining an integer having the residue class; determining a field element of a finite field such that the field element corresponds to the integer according to a predetermined mapping of the finite field to the set of integers; determining whether the field element fulfills a predetermined criterion and deciding whether the signature is valid based on whether the field element fulfills the predetermined criterion.

18 Claims, 4 Drawing Sheets

METHOD FOR VERIFYING AN ELECTRONIC SIGNATURE AND DATA PROCESSING DEVICE

TECHNICAL FIELD

The present disclosure relates to methods for verifying an electronic signature and data processing devices.

BACKGROUND

For ensuring the integrity of transmitted data in electronic data communication, data may be signed, typically using a private cryptographic key, before sending the data. The receiver can then check whether the signature is valid and thus check whether the data has been altered by a third party or by communication error using a public key of the transmitter. To ensure high security, private and public keys with a high number of bits are used. Accordingly, the computational cost for signature verification can be high. Accordingly, it is desirable to reduce the computational cost and complexity of signature verification.

SUMMARY

According to one embodiment, a method for verifying an electronic signature is provided including determining a residue class given by the signature; determining an integer having the residue class; determining a field element of a finite field such that the field element corresponds to the integer according to a predetermined mapping of the finite field to the set of integers; determining whether the field element fulfills a predetermined criterion and deciding whether the signature is valid based on whether the field element fulfills the predetermined criterion.

According to another embodiment, a data processing device according to the method for verifying an electronic signature described above is provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION

The following detailed description refers to the accompanying drawings that show, by way of illustration, specific details and aspects of this disclosure in which the invention may be practiced. These aspects of this disclosure are described in sufficient detail to enable those skilled in the art to practice the invention. Other aspects of this disclosure may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
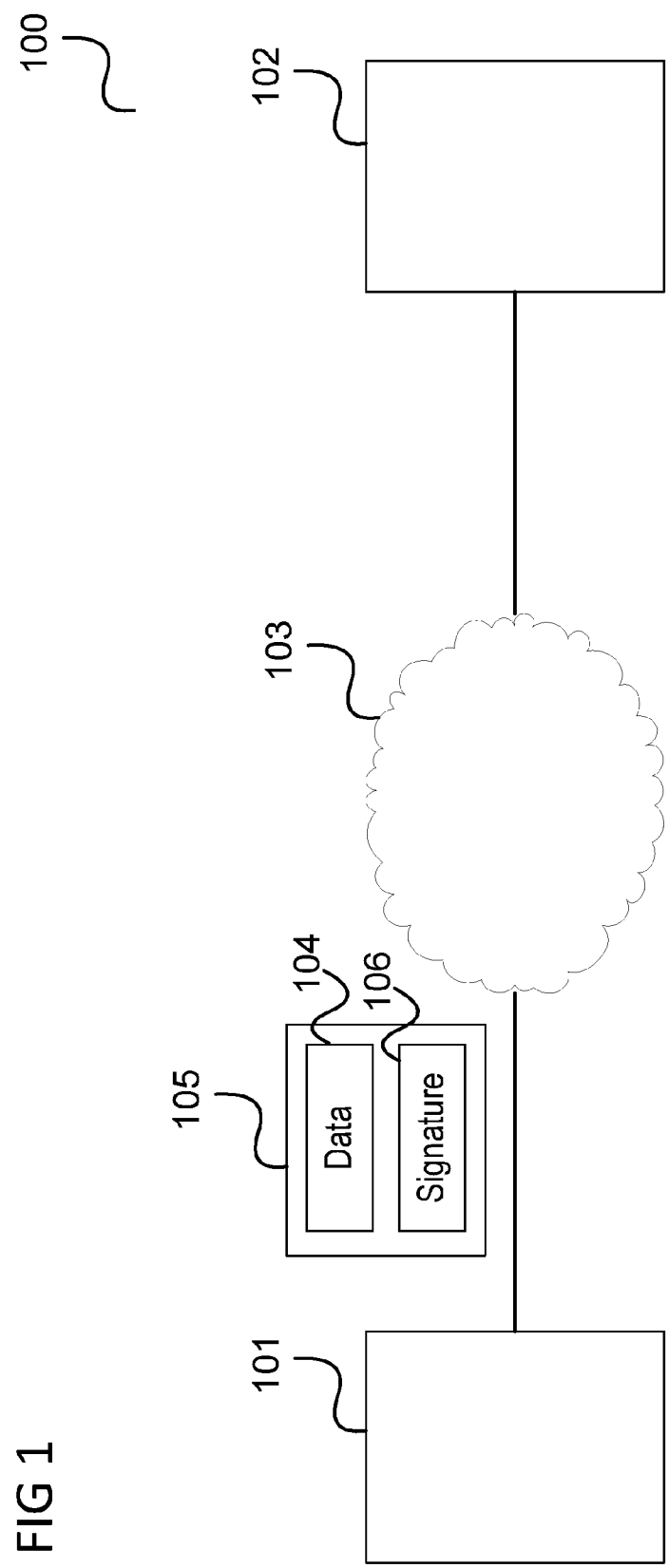
FIG. 1 shows a communication arrangement according to an embodiment.

FIG. 1 shows a communication arrangement 100 according to an embodiment.

The communication arrangement 100 includes a first communication device 101 and a second communication device 102 which are coupled via a communication network 103, e.g. via the Internet.

A communication device 101, 102 may for example be a computer, a mobile communication devices (e.g. a smart phone), a chip card etc.

The communication devices 101, 102 can exchange data via the communication network 103. For example, the first communication device 101 may transmit data 104 to the second communication device 102 by means of the communication network 103 using a communication service (such as e-mail) in a message 105. It may be important or desired that the integrity of the data 104 is ensured, for example to avoid that a third party changes the data 104 unnoticed by the second communication device 102. This can be achieved using a cryptographic electronic signature scheme. In such a scheme, the first communication device 101 signs the data 104, i.e. includes a signature 106 depending on the data 104 into the message 105, before transmitting the message 105 and the second communication device 102 checks whether the received signature 106 is valid for the data 104. The signature 106 will not be valid when a third party has altered the data 104 during transmission.

Signature schemes are for example based on elliptic curves, for example the signature schemes ECDSA (Elliptic Curve Digital Signature Algorithm), ECGDSA (Elliptic Curve German Digital Signature Algorithm) and EC-ElGamal. All these signature schemes are variants of a signature protocol originally described by Taher ElGamal.

Elliptic curves over finite fields form the mathematical basis for important schemes of modern public key cryptography such as the above signature schemes. An elliptic curve is defined by a cubic equation which is generally of the following form:

$$E: y^2 + a_1 xy + a_3 y = x^3 + a_2 x^2 + a_4 x + a_6$$

The coefficients $a_1, \ldots, a_6$ are elements of a (finite) field K.

The points of the elliptic curve E is the set of all pairs $(x,y) \in K \times K$, which fulfill the above equation for E. The elliptic curve is said to be a curve over K (or defined over K). The coordinate pair (x, y) of a point P of the elliptic curve is called the affine representation of the point P.

A finite field is a mathematical structure including a finite set of elements and four operations which are typical called addition, subtraction, multiplication and division wherein the arithmetical rules of the real numbers are formally valid for these operations. Elliptic curves defined over one of the following types of fields are of particular practical importance in cryptography:

K=GF(p), wherein p is a prime number. The objects (i.e. the field elements) of GF(p) are the integers 0, 1, 2, ..., p−1. The operations are the modulo addition, modulo subtraction, modulo multiplication and modulo division.

K=GF($2^n$), wherein n is a natural number. The objects (i.e. the field elements) are in this case the binary vectors of length n. The addition is the bit-wise XOR. Subtraction and addition are the same. The multiplication may be implemented by means of shift register operations.

A common characteristic of the above types of finite fields is that the division of field elements is much more costly (in terms of computational resources) than the multiplication of field elements. The difference in the computational cost is typically about one order of magnitude.

Besides the affine representation there exists the projective representation in which three coordinates are used in the form (x:y:z) to represent a point of the elliptic curve. The two representations are related as follows:

The affine representation of a point may be mapped to the projective representation according to $(x,y) \to (\lambda x : \lambda y : \lambda)$, wherein $\lambda \neq 0$ is an arbitrary element of K.

The affine representation of a point may be mapped to the projective representation according to $(X:Y:Z) \to (X/Z, Y/Z)$.

Arithmetical operations on elliptic curves like being carried out in cryptographic schemes based on elliptic curves include a sequence of a high number of field operations which include the costly divisions of field elements.

The projective representation allows reducing the number of divisions to be carried out, for example to a single division for verifying a signature.

Let in the following be K a finite field, E an elliptic curve over K, P∈K a point on the elliptic curve E which generates (according to the addition of points of the elliptic curve) a cyclic subset of the elliptic curve with prime order and $\beta = |<P>|$ the prime order of the subset of E generated by P.

For implementing the operation for points (e.g. addition of points) of the elliptic curve an arithmetic for the finite field K is required. As mentioned, in an implementation of a finite field arithmetic, the division is in general much more costly than the multiplication (and squaring). The difference may in an optimized implementation be as much as a factor of 40. Therefore, the following may be done for minimizing the time required for signature generation and signature verification:

For points on the elliptic curve the projective representation is used. All intermediate results are represented as fractions. This allows avoiding divisions of field elements for the calculation of intermediate results in the point multiplication. The resulting formulas are more complex than the formulas with division and require more multiplication and squaring operations. The resulting implementation is typically still more efficient.

At the end of point operations a single field division (or inversion) is carried out to bring the result in projective representation into the affine representation. With the affine representation the verification of the signature may then be carried out.

This approach is in the following described for the example of a scheme for the verification of electronic signatures according to ECDSA.

The input of the verification scheme is a hash value h, wherein h is an integer (e.g. a hash value of the data 104), Q∈E the public key of the generator of the signature (e.g. the first communication device 101), (r, s) the signature (or signature value) wherein r and s are integers.

The scheme outputs the information whether the signature is valid or invalid (e.g. for the data 104).

In this example, the following is carried out:
1. Check whether $0 \leq h < \beta$; if not, the signature is invalid.
2. Check whether $0 < r < \beta$; if not, the signature is invalid.
3. Check whether $0 < s < \beta$; if not, the signature is invalid.
4. Determine $t = 1/s \bmod \beta$; $u = h*t \bmod \beta$ and $v = r*t \bmod \beta$.
5. Determine the affine x-coordinate w of the point u*P+ v*Q by means of the arithmetic of E over K.
6. Map the field element w by means of a suitable mapping to an integer z.
7. Check whether the equation $r = z \bmod \beta$ is fulfilled; if yes, the signature is valid; if not, the signature is invalid.

In 5. the affine x-coordinate w of the intermediate result is determined since the following mapping to the integers in 6. and the reduction modulo the order β lead to sequential operations in different mathematical structures whose order of execution may not be changed and for which a distributive law is not fulfilled. Therefore, it is not possible to easily algebraically change the last steps of the signature verification without having a wrong result.

According to one embodiment, a method for verifying an electronic signature (for example according to one of the signature schemes mentioned above) is provided in which no final conversion of a point in projective representation to affine representation is necessary. Thus, in an implementation (e.g. in the second communication device 102) an implementation of an algorithm for division (or inversion) in the field K on which the elliptic curve is based is not necessary.

Figure 2:
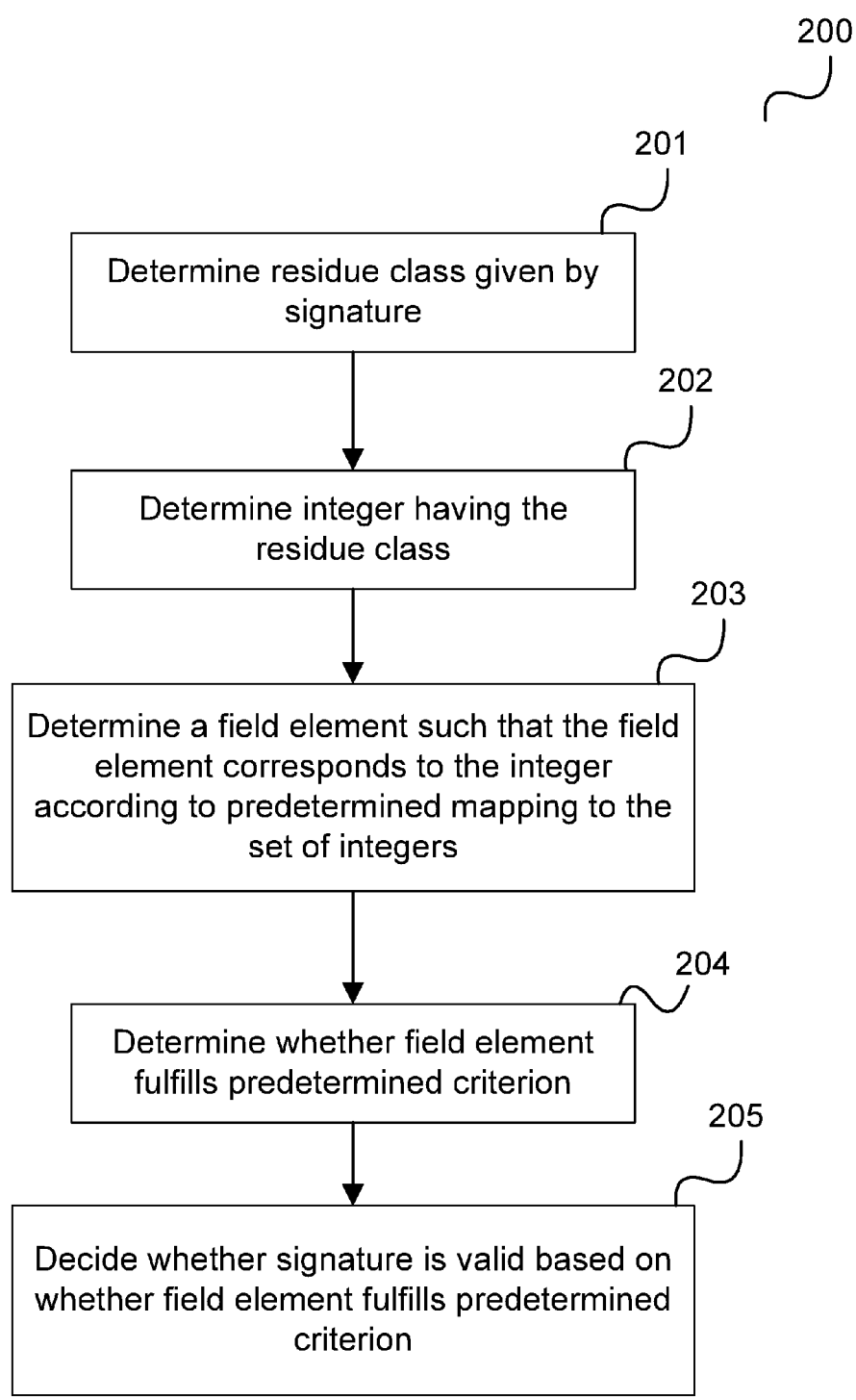
FIG. 2 shows a flow diagram according to an embodiment.

FIG. 2 shows a flow diagram 200 according to an embodiment.

The flow diagram 200 illustrates a method for verifying an electronic signature.

In 201, an integer having the residue class of the signature value r is determined.

In 202, a field element of a finite field is determined such that the field element corresponds to the integer according to a predetermined mapping of the finite field to the set of integers.

In 203, it is determined whether the field element fulfills a predetermined criterion.

In 204, it is decided whether the signature is valid based on whether the field element fulfills the predetermined criterion.

In other words, according to one embodiment, the final check in a signature verification scheme is reversed: Instead of determining, for example, a field element based on a criterion and determining whether the image of the field element belongs to a residue class given by the signature, one or more candidates of the field whose images belong to the residue class are determined and it is checked whether any of these candidates fulfills the criterion.

The signature is for example a signature generated by a signature generation scheme based on an elliptic curve.

The finite field is for example the field over which the elliptic curve is defined.

For example, the finite field is GF(p) or $GF(2^n)$.

The residue class is for example an integer residue class modulo the order β of a point P generating a cyclic subgroup of the elliptic curve.

For example, the signature is a signature generated using the point P.

According to one embodiment, it is decided that the signature is valid if the field element fulfills the predetermined criterion.

According to one embodiment, the method includes determining a plurality of integers having the residue class, determining, for each integer of the plurality of integers a field element of the finite field such that the field element corresponds to the integer according to a predetermined mapping of the finite field to the set of integers, determining whether any of the field elements fulfills the predetermined criterion and deciding whether the signature is valid based on whether any of the field elements fulfills the predetermined criterion.

It is for example decided that the signature is valid if any of the field elements fulfills the predetermined criterion.

The plurality of integers for example includes all integers corresponding to the residue class and being smaller than the order of the finite field.

The method for example includes deciding that the signature is not valid if none of the field elements fulfills the predetermined criterion.

According to one embodiment, the method further includes determining a point of an elliptic curve in projective representation and the criterion is whether the field element is equal to the affine coordinate of the point of the elliptic curve.

The predetermined mapping of the field to the set of integers is for example a mapping of the field to the set of integers from zero to the order of the finite field minus one.

The criterion is for example whether the field element fulfills an equation of a polynomial being zero.

According to one embodiment, the method includes receiving a signature value including an integer giving the residue class.

The method may further include receiving data and determining a hash value for the received data, and determining the criterion based on the hash value.

For example, it is decided whether the signature is valid for the data.

Figure 3:
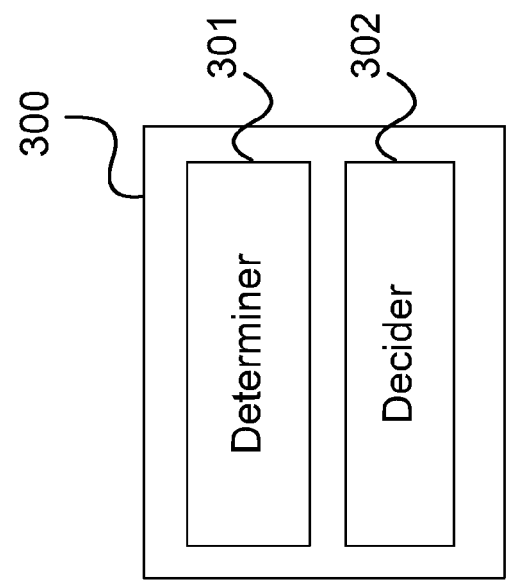
FIG. 3 shows a data processing device according to an embodiment.

The method illustrated in FIG. 2 is for example carried out by a data processing device as illustrated in FIG. 3.

FIG. 3 shows a data processing device 300 for verifying an electronic signature according to an embodiment.

The data processing device 300 for example corresponds to the second communication device 102.

The data processing device 300 includes a determiner 301 configured to determine a residue class given by the signature, determine an integer having the residue class, determine a field element of a finite field such that the field element corresponds to the integer according to a predetermined mapping of the finite field to the set of integers and determine whether the field element fulfills a predetermined criterion.

The data processing device 300 further includes a decider 302 configured to decide whether the signature is valid based on whether the field element fulfills the predetermined criterion.

It should be noted that embodiments described in context of the method described with reference to FIG. 2 are analogously valid for the data processing device 300 and vice versa.

The components of the data processing device (e.g. the determiner and the decider) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit".

In the following, an example for a verification of a signature is described in more detail.

The embodiments described in the following may be seen to exploit a characteristic of elliptic curves suitable for signature schemes and cryptographically strong elliptic curves. A requirement for the security of a signature schemes is that the order of the cyclic subgroup <P> is sufficiently large such that the discrete logarithm problem for the elliptic curve is algorithmically difficult. Practically, this means that the subgroup <P> has, depending of the application, typically at least $2^{160}$ or more points. To achieve that the resulting signature scheme has high performance the elliptic curve E is typically selected such that for the number of all points on the elliptic curve the condition |E|=k*|<P>| with k, the so-called cofactor, being a small integer (typically k≤5), is fulfilled. For elliptic curves over the prime fields GF(p) k=1 is optimal. For elliptic curves over extension fields GF($2^n$) k=2 is optimal.

Since the numbers |E| and β=|<P>| only differ by a small factor k and since, according to Hasse's theorem, the relation |K|+1−2√|K|≤|E|≤|K|+1+2√|K| holds for the possible number of points |E| on an elliptic curve the inequality $$\frac{|K|}{\beta} = k\frac{|K|}{|E|} \le \frac{k|K|}{|K|+1-2\sqrt{|K|}} < k + \frac{2k}{\sqrt{|K|}-2}$$

holds.

Thus, for magnitudes of practical relevance, only k+1 field elements $w_1, \ldots, w_{k+1} \in E$ K exist which may arise in 5. of the verification scheme given above as intermediate result of an affine x-coordinate such that their images $z_1, \ldots, z_{k+1}$ 1 in the set of images according to the mapping of the field K to the set of integers according to 6. fulfill $r = z_i \mod \beta$ for $1 \le i \le k+1$.

Therefore, according to one embodiment, instead of determining the affine x-coordinate of an intermediate result by means of a division in the field K and to check whether its image in the integers fulfills the congruence with r, the k+1 field elements $w_1, \ldots, w_{k+1} \in K$ whose images fulfill the congruence with r are constructed (as possible candidates for the affine x-coordinate) and it is checked whether one of these field elements corresponds to the x-coordinate of the intermediate result in projective representation. For this check at most k+1 field multiplications are required. This approach is for example efficiently applicable for the signature schemes mentioned above for which the mapping of field elements to the set of integers can be efficiently reversed. With this approach, a scheme for signature verification can be implemented that does not require any field division or inversion.

According to one embodiment, in a practical implementation, the candidates for the affine x-coordinate $w_1, \ldots, w_{k+1} \in K$ of the intermediate result (i.e. the point u*P+v*Q) are individually constructed and tested to minimize the required memory space and the effort (i.e. the computational cost).

Let (X,Z) be the projective x-coordinate, i.e. the projective representation of the affine x-coordinate, of the intermediate result u*P+v*Q. Instead of calculating in 5. the x-coordinate in affine representation of this point in of the above scheme, 6. and 7. are for example replaced by the flow as illustrated in FIG. 4.

Figure 4:
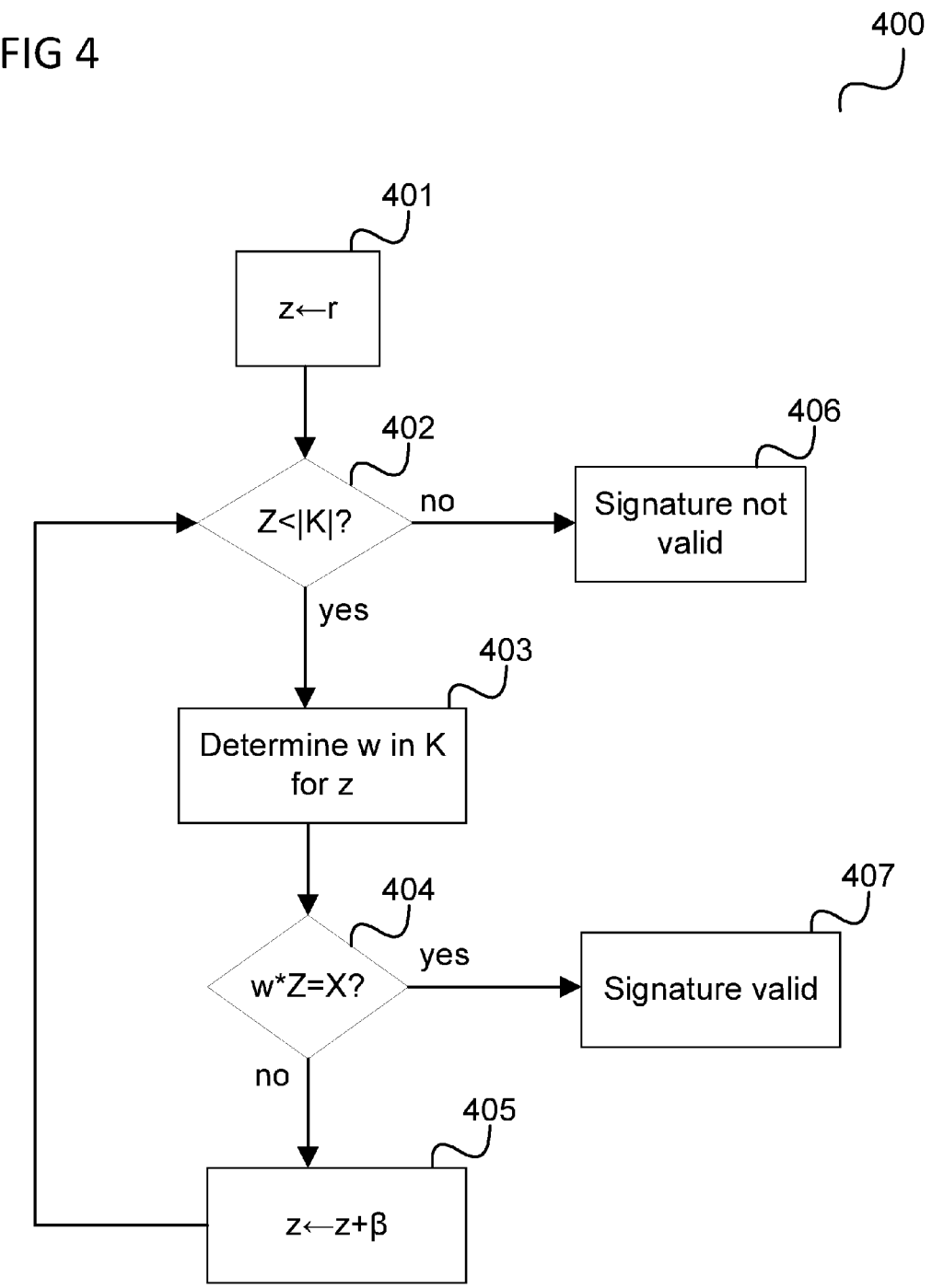
FIG. 4 shows a flow diagram according to an embodiment.

FIG. 4 shows a flow diagram 400 according to an embodiment.

In 401, the integer variable z is initialized with the integer r.

In 402, it is checked whether z<|K|. If this is not the case, it is decided that the signature is invalid. If it is the case, the field element w corresponding to the integer z according to the mapping of the field to the integers is determined in 403.

In 404, it is determined whether in the field K the equation w*Z=X is fulfilled. If this is the case, it is decided that the signature is valid. If this is not the case, the value of z is replaced by z+β and the process continues with (returns to) 402.

The decision in 402 can be seen to implement a while loop that carries out 403 to 405 while z<|K| which is only interrupted if the check in 404 is positive, i.e. a candidate that corresponds to the x-coordinate in projective representation (X, Z) has been found.

The verification based on the approach illustrated in FIG. 4 is correct for the following reasons. In the finite field the equation $X=w*Z$ holds wherein w is the affine x-coordinate corresponding to the x-coordinate in projective representation (X, Z). If an integer $0 \leq j \leq k$ exists such that the integer $z_{j+1}=r+j*\beta$ is the image of a field element $w_j \in K$ with $X=w_j*Z$ it follows that $w_j=w$. Conversely, it follows from the properties of the field K and the arithmetic modulo $\beta$ in the integers that each field element w whose image in the set of integers fulfills the congruence $r \equiv z$ modulo $\beta$ needs to have the form $z=r+j*\beta$ for a suitable number $0 \leq j < k$.

The above example has been given for the implementation of a signature verification scheme according to ECDSA. The approach described above, e.g. with reference to FIG. 2 is not limited to this scheme, however, but may analogously be transferred to other ElGamal-type signature schemes based on elliptic curves. It should further be noted that the approach may be used for elliptic curves over finite fields of various characteristics.

The approach described above has the following properties:

It allows an implementation of the verification of an ElGamal type signature over elliptic curves for which no divisions in finite fields is necessary. This reduces the code size of the implementation.

It allows an efficient signature verification since firstly in case of cryptographically strong elliptic curves the cofactor $k=|E|/|\langle P \rangle|$ which determines the number of cases to be tested (i.e. the number of possible candidates for the affine coordinate of the point $u*P+v*Q$) is small and secondly per case to be tested (i.e. per check whether a candidate is equal to the affine x-coordinate of the point $u*P+v*Q$) only one integer addition, a determination of a field element corresponding to the integer, a field multiplication and a comparison is required. In all practically relevant implementations of arithmetic of finite fields and suitable elliptic curves the effort (i.e. the computational cost) for verifying a given signature in this way is less than the effort of performing a single field division.

It allows a correct implementation.

It allows verification of electronic signatures generated in accordance with the standard.

In the following, a further example for a scheme for the verification of ECDSA signatures is described which allows an efficient and compact implementation.

Let x(P) be the x-coordinate of the point P which generates the cyclic subgroup $\langle P \rangle$ of the order $\beta$ and let x(Q) be the x-coordinate of the point $Q \in E$. The point Q is the public key of the generator of the signature, e.g. the user of the first communication device 101.

The input of the verification scheme is a hash value h, wherein h is an integer (e.g. a hash value of the data 104), x(Q) the x-coordinate of the public key $Q \in E$ of the generator of the signature (e.g. the first communication device 101), (r, s) the signature (or signature value) wherein r and s are integers.

The scheme outputs the information whether the signature is valid or invalid (e.g. for the data 104).

In this example, the following is carried out:
1. Check whether $0 \leq h < \beta$; if not, the signature is determined to be invalid
2. Check whether $0 < r < \beta$; if not, the signature is determined to be invalid
3. Check whether $0 < s < \beta$; if not, the signature is determined to be invalid
4. Determine $t=1/s \mod \beta$, $u=h*t \mod \beta$ and $v=r*t \mod \beta$
5. Determine projective x-coordinate $(X_1, Z_1)$ of the point $u*P$ by means of arithmetic in E over K
6. Determine projective x-coordinate $(X_2, Z_2)$ of the point $v*Q$ by means of arithmetic in E over K
7. Initialize variable z with r
8. while $z < |K|$ do
9. Determine field element w whose image in the set of integers is z
10. If for the polynomial $F(w, X1, Z1, X2, Z2)=0$ holds accept signature as valid and quit while loop
11. Increase z by $\beta$
12. od (end of while loop)
13. Reject signature as invalid In 5. and 6. the projective x-coordinates of the results of the point multiplication are for example determined using the Montgomery ladder algorithm. The polynomial F is a quadratic polynomial in w whose concrete form depends on the characteristic of the finite field K.

For characteristic 2, i.e. for $K=GF(2^n)$, the polynomial F for example has the form $$F(w,X_1,Z_1,X_2,Z_2)=w^2(X_1Z_2+X_2Z_1)^2+X_1^2X_2^2+wX_1X_2Z_1Z_2+bZ_1^2Z_2^2$$

wherein the field element b is the constant curve parameter of the defining elliptic curve (in short Weierstraß representation for characteristic 2), i.e. corresponds to $a_6$ in the representation of the elliptic curve given above.

For characteristic 3, the polynomial F for example has the form $$F(w,X_1,Z_1,X_2,Z_2)=w^2(X_1Z_2-X_2Z_1)^2+w(X_1X_2(X_1Z_2+X_2Z_1-a_2Z_1Z_2)-a_6Z_1^2Z_2^2)+X_1^2X_2^2-a_6Z_1Z_2(X_1Z_2+X_2Z_1+a_2Z_1Z_2)$$

with $a_2$, $a_6$ as in the representation of the elliptic curve given above.

For characteristic higher than 3, the polynomial F has for example the form $$F(w,X_1,Z_1,X_2,Z_2)=w^2(X_1Z_2-X_2Z_1)^2-2w((a_4Z_1Z_2+X_1X_2)(X_1Z_2+X_2Z_1)+2a_6Z_1^2Z_2^2)+(X_1X_2-a_4Z_1Z_2)^2-4a_6Z_1Z_2(X_1Z_2+X_2Z_1)$$

with $a_2$, $a_4$ and $a_6$ as in the representation of the elliptic curve given above.

In case that for finite fields of characteristic 2 instead of the curve parameter b a uniquely determined square root is used the polynomial F can be evaluated using eight field multiplications and one squaring operation.

The following is shown: The scheme above accepts a signature for a hash value h if and only if the signature is a valid signature for the hash value which has been generated according to the signature scheme ECDSA or EC-ElGamal.

Let $0 < \alpha < \beta$ be the private key which has been used for creation of the public key $Q=\alpha*P$. Let a hash value h be given and a signature (r, s) be given which is accepted by the above scheme as valid signature for the hash value h. The scheme determines in 5. and 6. the x-coordinates $x(V_1)$, $x(V_2)$ of the points $V_1=h/s*P$ and $V_2=r/s*Q=(\alpha*r/s)*P$. Subsequently, the scheme searches for an integer z such that the field elements $x(V_1), x(V_2)$ and w (which has the image $z=r+j*\beta$ in the set of integers) fulfill the equation of F being zero. It follows from the properties of the equation of F being zero and the completeness of the group operation in the point subgroup that $w=x(R)$ is the x-coordinate of a point $R \in \langle P \rangle$. Let $w=k*P$ with $0 \leq k < \beta$. Then, per construction of the polynomial F, either $x(R)=x(V_1+V_2)=x((h+a*r)/s*P$ or $x(R)=x(V_1-V_2)=x((h- a*r)/s*P) holds. These conditions are equivalent to k−(h+a*r)/s≡0 mod β, k+(h+a*r)/s≡0 mod β, k−(h−a*r)/s≡0 mod β or k+(h−a*r)/s≡0 mod β.

Transforming these equations yields s=±1/k*(h+a*r) mod β or s=±1/k*(h−a*r) mod β, wherein r=x(k*P) mod β.

The equations correspond to the definition of a valid signature generated either according to the ECDSA standard or the EC-ElGamal standard using the private key α. For this, it should be noted that in both signature schemes a sign change of the value s modulo β has no influence on the validity of the signature as ECDSA or EC-ElGamal signature. This is a direct consequence of the property of the above scheme that only the x-coordinate is determined of the points $V_1+V_2$ and $V_1-V_2$.

Therefore, the difference in the output of the above scheme compared to the standard ECDSA method is that the sign of the hash value h modulo β is of no relevance for the validity of the signature. This means that a signature (r, s) which is a valid signature for a hash value h is also a valid signature for the hash value −h mod β. Thus, the scheme described above accepts a signature generated according to the ECDSA standard for hash value h as valid signature but further accepts the signature for the hash value −h mod β for which it is not a valid signature according to ECDSA but according to EC-ElGamal (and vice versa).

In addition to the properties of the approach mentioned above the scheme including 1. to 13. described above has the following properties:

In the whole scheme for verifying electronic signatures only the x-coordinates of points are used. Thus, program parts for determining y coordinates of the points $V_1$ and $V_2$ are not required.

By using the polynomial F program parts for determining the x-coordinate of the sum of the points $V_1$ and $V_2$ are not required.

Less memory (e.g. non-volatile memory such as flash or EEPROM) needs is required for storing the points P and Q since only the x-coordinates of these points are required.

The above scheme may for example be implemented on a 16 bit microcontroller in 2.2 KByte code, e.g. on a chip card.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

What is claimed is:

1. A method for verifying an electronic signature by a data processing device comprising one or more processors, the method comprising determining by at least one of the one or more processors a residue class given by the signature;
determining by at least one of the one or more processors an integer having the residue class;
determining by at least one of the one or more processors a field element of a finite field such that the field element corresponds to the integer according to a predetermined mapping of the finite field to the set of integers;
determining by at least one of the one or more processors whether the field element fulfills a predetermined criterion; and
deciding by at least one of the one or more processors whether the signature is valid based on whether the field element fulfills the predetermined criterion.

2. The method according to claim 1, wherein the signature is a signature generated by a signature generation scheme based on an elliptic curve.

3. The method according to claim 2, wherein the finite field is the field over which the elliptic curve is defined.

4. The method according to claim 2, wherein the finite field is GF(p) or GF($2^n$).

5. The method according to claim 2, wherein the residue class is an integer residue class modulo the order of a point P generating a cyclic subgroup of the elliptic curve.

6. The method according to claim 5, wherein the signature is a signature generated using the point P.

7. The method according to claim 2, wherein the method further comprises determining a point of an elliptic curve in projective representation and the criterion is whether the field element is equal to the affine coordinate of the point of the elliptic curve.

8. The method according to claim 1, comprising deciding that the signature is valid if the field element fulfills the predetermined criterion.

9. The method according to claim 1, comprising
determining by at least one of the one or more processors a plurality of integers having the residue class;
determining by at least one of the one or more processors, for each integer of the plurality of integers a field element of the finite field such that the field element corresponds the integer according to a predetermined mapping of the finite field to the set of integers;
determining by at least one of the one or more processors whether any of the field elements fulfills the predetermined criterion; and
deciding by at least one of the one or more processors whether the signature is valid based on whether any of the field elements fulfills the predetermined criterion.

10. The method according to claim 9, comprising deciding that the signature is valid if any of the field elements fulfills the predetermined criterion.

11. The method according to claim 9, wherein the plurality of integers comprises all integers corresponding to the residue class and being smaller than the order of the finite field.

12. The method according to claim 9, comprising deciding that the signature is not valid if none of the field elements fulfills the predetermined criterion.

13. The method according to claim 1, wherein the predetermined mapping of the field to the set of integers is an injection of the field into the set of integers from zero to the order of the finite field minus one.

14. The method according to claim 1, wherein the criterion is whether the field element fulfills an equation of a polynomial being zero.

15. The method according to claim 1, further comprising receiving a signature value comprising an integer giving the residue class.

16. The method according to claim 1, further comprising receiving data and determining a hash value for the received data, and determining the criterion based on the hash value.

17. The method according to claim 16, wherein it is decided whether the signature is valid for the data.

18. A data processing device for verifying an electronic signature comprising:
a determiner comprising one or more processors and configured to determine a residue class given by the signature, determine an integer having the residue class, determine a field element of a finite field such that the field element corresponds to the integer according to a predetermined mapping of the finite field to the set of integers and determine whether the field element fulfills a predetermined criterion; and a decider comprising one or more processors and configured to decide whether the signature is valid based on whether the field element fulfills the predetermined criterion.

* * * * *